Jan. 21, 1969 H. H. SEPHTON 3,423,294
VORTEX FLOW FILM DISTILLATION PROCESS
Filed Nov. 14, 1966 Sheet 1 of 5
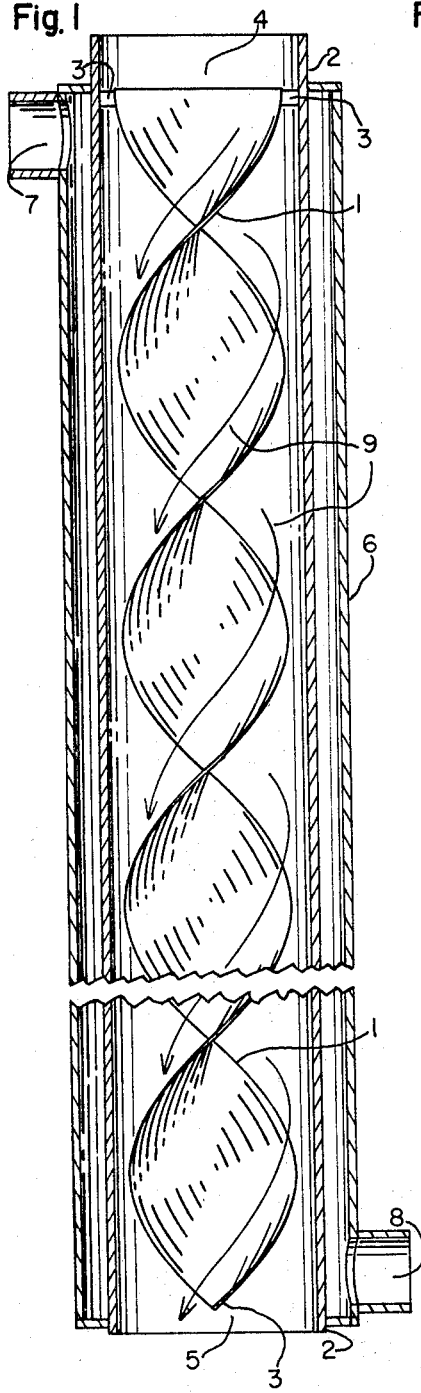
Fig. I
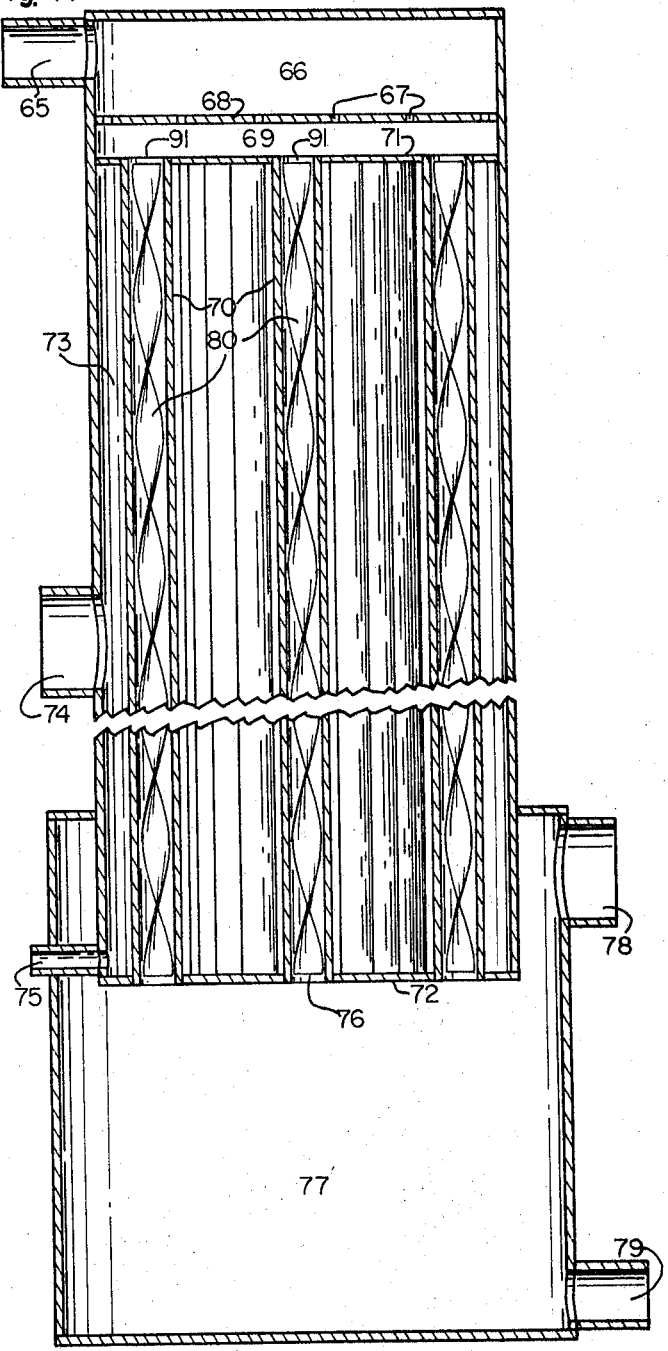
Fig. VI
INVENTOR
Hugo H. Sephton

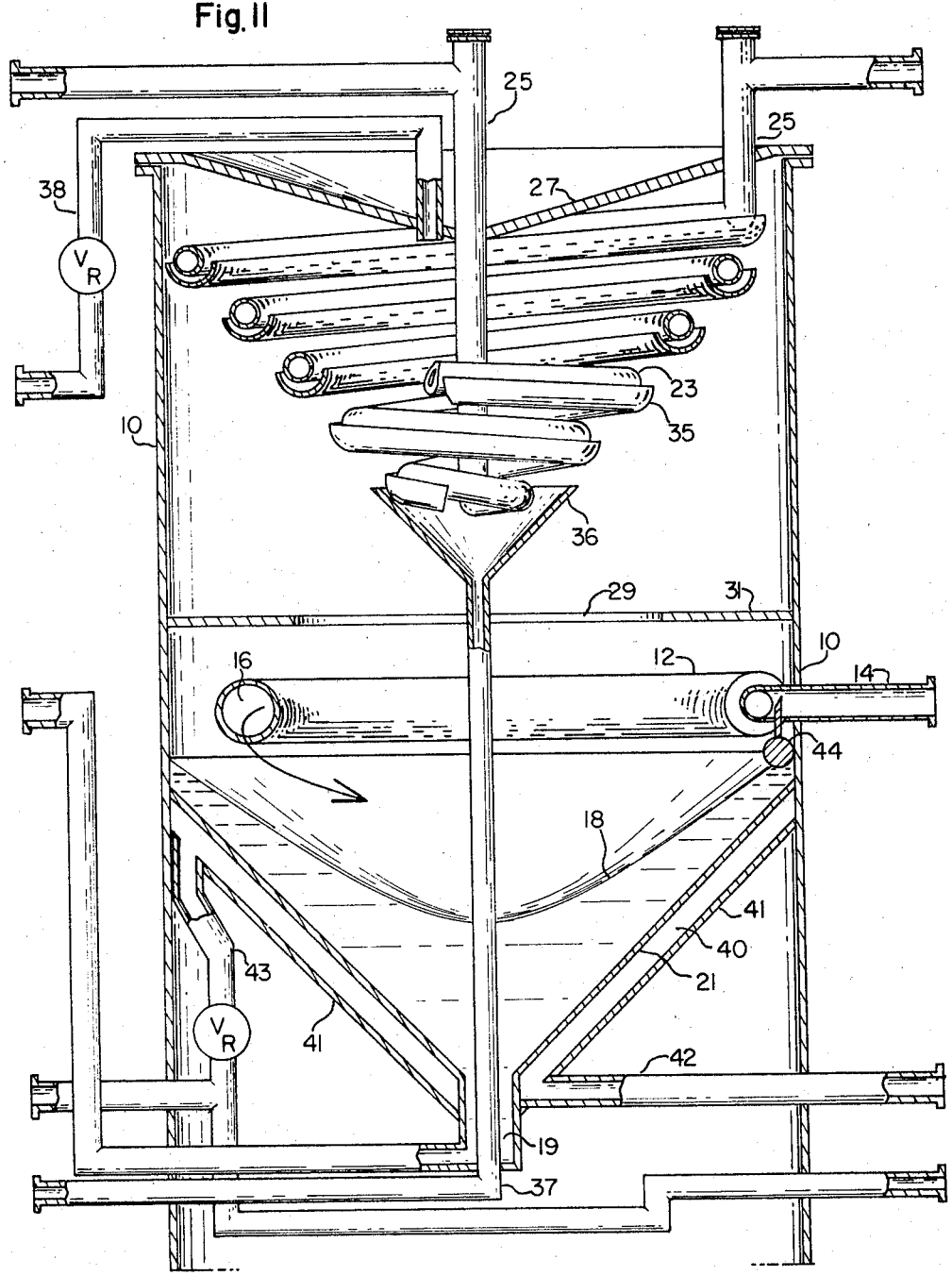

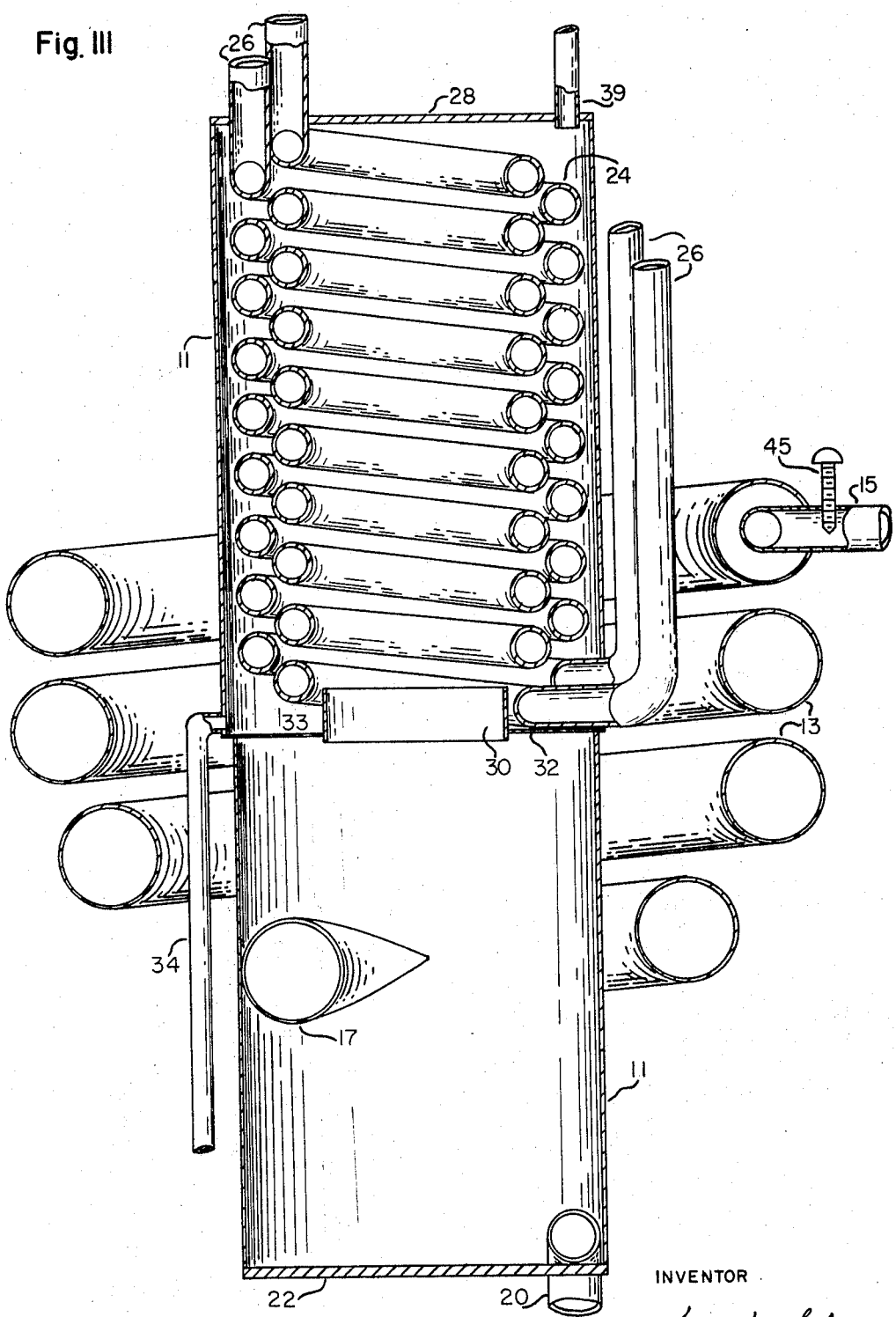

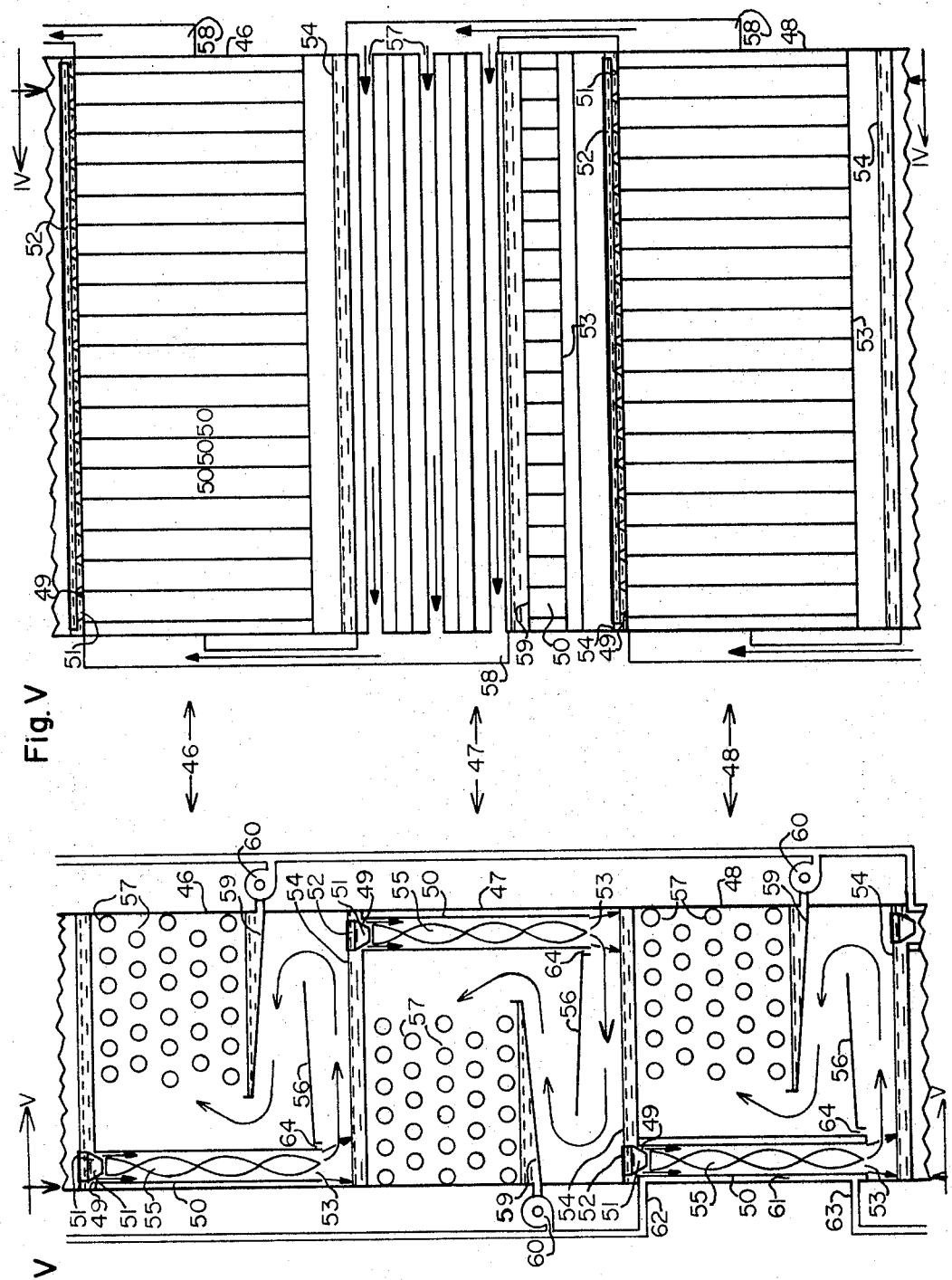

Jan. 21, 1969 H. H. SEPHTON 3,423,294
VORTEX FLOW FILM DISTILLATION PROCESS
Filed Nov. 14, 1966 Sheet 5 of 5
Fig. VII
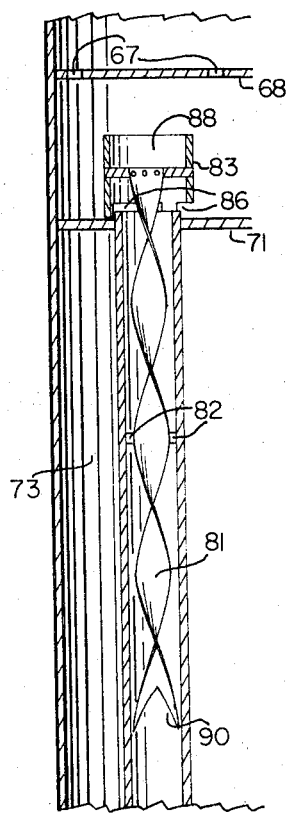
Fig. VIII
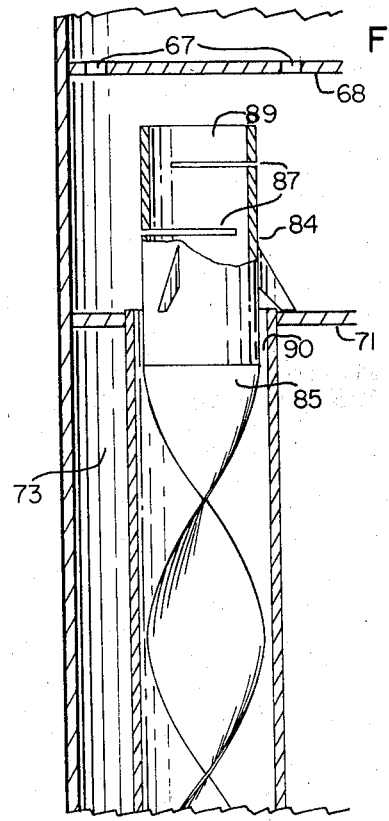
Fig. IX
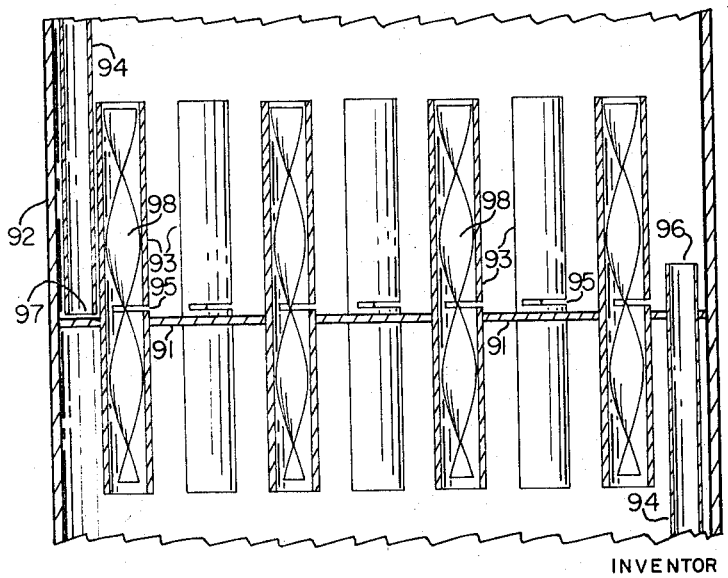
INVENTOR
Hugo H. Sephton United States Patent Office 3,423,294
Patented Jan. 21, 1969

3,423,294
VORTEX FLOW FILM DISTILLATION PROCESS
Hugo H. Sephton, 35 Anson Way,
Berkeley, Calif. 94707
Continuation-in-part of application Ser. No. 274,468,
Apr. 22, 1963. This application Nov. 14, 1966, Ser.
No. 594,165
U.S. Cl. 203—10                                    9 Claims
Int. Cl. B01d 3/08

ABSTRACT OF THE DISCLOSURE

Process of forming a continuous liquid annulus adjacent an inside heat exchange tube surface. A spiral ribbon is axially disposed within the tube, the edges of which are spaced from the liquid annulus. Fluid of lighter density flows in a vortex created by the spiral element.

---

This application is a continuation-in-part of my copending applications, Ser. No. 274,468, filed Apr. 22, 1963, entitled Flash Evaporation and Condensation Apparatus, now U.S. Patent No. 3,285,832, and Ser. No. 412,073, filed Nov. 18, 1964, entitled Evaporation and Distillation Process and Apparatus Utilizing a Flash Tube.

In summary, this invention has as an objective a process and apparatus for the concentration, evaporation and distillation of liquids. The process provided hereby comprises the simultaneous steps of flowing the liquid through an elongate confined space or a conduit, partially vaporizing the liquid within the confined space or conduit, imposing centrifugal forces upon the flow system within the confined space or conduit so as to effect phase separation thereof under a continuous vapor pressure gradient, and thereafter condensing the vapor. It depends upon the use of a "flash tube" or "vapor vortex tube" which provides for vaporization of the liquid from shallow liquid layers with enhanced thermal efficiency and with the concomitant removal of liquid droplet entrainment from the vapor phase and, thereafter, for fast rates of vapor flow between the site of vaporization and the site of condensation of the vapor.

The process of this specification allows for the use of relatively small evaporation or distillation units to achieve a particular distillate production rate. It also allows for the addition of heat of vaporization to the liquid maintained in shallow layer flow within the flash tube. It allows for increased flexibility in the number, shape, and in the flow arrangement of evaporator stages for multistage flash distillation. The process relies upon the use of a "flash tube" or "vapor vortex tube" wherein a distilland is partially vaporized while it is caused to flow through a conduit under a continuous pressure gradient and temperature gradient with the concomitant imposition of centrifugal forces upon the fluid system by the continuous deflection of the vapor flow by arcuate structure within the conduit. This arcuate structure is provided by bending the conduit or by inserting a baffle having curved structure and securing it within the conduit. This arcuate baffle is made, in a preferred form, by twisting an elongate ribbon of metal or other suitable material narrower in width than the inside diameter of the conduit into a spiral or helical shape of suitable pitch, and by securing it in an axial position inside the conduit so as to leave an annular free passage for the liquid flow adjacent to the conduit inside wall. A curved flow channel is thus provided wherein the direction of flow of a fluid system is continuously deflected under a continuous pressure gradient. This pressure gradient is, in part, dependent upon the magnitude of the centrifugal forces imposed upon the fluid system. The flash tube or vapor vortex tube therefore functions as a two-phase flow control device wherein phase separation, such as the removal of liquid droplet entrainment from the vapor phase, is effected by centrifugal action or vortex flow, and wherein the liquid phase is largely maintained as a continuous, flowing layer in contact with the tube wall thereby to dispose it favorably for heat addition thereto through the tube wall or through the vapor phase. The flash tube can thus be utilized as either or both a flashing device without heat addition through the tube wall as in flash distillation, and a distillation device with heat addition either through the tube wall as in long tube vertical distillation or through the vapor phase as in fracional distillation or both. It should be noted that prolonged contact between the liquid and vapor phases as they flow through the vapor vortex tube or flash tube allows time and interphase contact that promotes thermal equilibration between these two phases both when they flow in the same direction and when in countercurrent flow. In the application of the vapor vortex tube to fractional distillation the flow pattern is countercurrent with hot vapor in upward flow and an evaporating liquid in downward film flow.

The vapor vortex tube or flash tube principles of this specification therefore include:

(a) Phase separation or multi-phase flow control of a fluid system or systems caused to flow, under a continuous pressure gradient, through a conduit comprising arcuate structure for the imposition of centrifugal forces upon the fluid flow.

(b) Two-phase or multi-phase flow control as under (a) and, in addition, the provision for either or both heat transfer and mass transfer from one phase to another phase within the conduit, and the provision for heat exchange of the wall of the conduit with both the fluid system therein and with a fluid system passed in heat exchange relationship with the outside wall of the conduit.

(c) Phase separation or two-phase flow control of an evaporating liquid and its vapor caused to flow under a continuous pressure gradient through a conduit comprising curved structure for the imposition of centrifugal forces upon the fluid flow.

(d) As in (c) but with the addition of heat of vaporization either through the wall of the conduit or through the vapor phase.

(e) As in (d) but with countercurrent flow of a liquid and a vapor or gas phase, especially with downward film flow of an evaporating liquid and upward vortex flow of relatively hot vapor.

This specification will mainly be directed to a process and apparatus for the production of potable water from sea water, but wide application for the concentration, evaporation and distillation of liquids, and for the separation of fluids as in phase separation, is implied and will become apparent from this specification to those skilled in the art.

FIG. I is a side view section through the tube wall of the preferred form of the flash tube or vapor vortex tube showing the spirally twisted ribbon baffle; it is essentially a fluid flow phase separator with, in addition, provision for heat exchange through the tube wall.

FIG. II is a side view section of a flash tube evaporator with a curved flash tube located entirely within the cylindrical evaporator body.

FIG. III is a side view section of a flash evaporator with a helical coiled flash tube mainly outside of a cylindrical cyclone separator vessel.

FIG. IV and FIG. V show the preferred flow pattern in a portion of a multi-stage cascade flash evaporator, utilizing vapor vortex tubes, by a schematic end view section and a schematic side view section.

FIG. VI is a side view section of a long tube vertical (LTV) evaporator utilizing the vapor vortex tube principles for two-phase flow control.

FIG. VII and FIG. VIII are side view sections of the top ends of LTV distillation tubes showing preferred inlet flow control weirs combined with a short length of the preferred spiral baffle insert of this invention.

FIG. IX is a side view section of a fractional distiller utilizing vapor vortex tubes for two-phase flow control.

A fluid system consisting of gas and/or liquid or other multi-phase fluid that is caused to flow through a straight conduit undergoes a pressure drop which depends in part upon the speed of flow and upon viscous flow properties thereof in interaction with the wall of the conduit. If centrifugal forces are, in addition, imposed upon such a fluid system, such as by bending the conduit into an arcuate shape or by inserting a suitable baffle of arcuate structure therein, the pressure drop will be increased by a factor that is related to the magnitude of the centrifugal forces imposed upon the fluid flow system. This increase in pressure drop will be continuous over that length of the conduit that comprises the arcuate structure and the fluid flow system can thus be said to be subject to a pressure gradient in relation to the centrifugal forces imposed thereon. If the fluid system is composed of two or more phases of different density, phase separation will be effected by the imposition of centrifugal forces thereon. When a liquid distilland with suitable heat content (temperature) is caused to flow through such a conduit, from a suitable and relatively high pressure at the entrance to the conduit to a suitable, relatively low pressure maintained at the outlet of the conduit, the liquid will vaporize partially or flash during its passage through the conduit. Liquid droplets are usually entrained in the vapor phase thus produced and, unless removed therefrom before condensation of the vapor, will contaminate the condensate or distillate with unevaporated distilland. The flash tube of this invention provides means for removing entrained liquid from the vapor phase within the flash tube or vapor vortex tube and for returning these to the liquid phase. Furthermore, the liquid phase is maintained in the form of a flowing film or layer in contact with the wall of the conduit, thereby disposing it favorably for heat addition thereto through the wall of the conduit or via the vapor phase in vortex flow contact therewith. The process provided by the flash tube of this invention therefore includes the simultaneous steps of partially vaporizing a liquid while flowing it through a conduit comprising arcuate structure, imposing centrifugal forces upon the flowing liquid-vapor-system under a continuous vapor pressure gradient, and thereafter condensing the purified vapor. A major advantage of this process is that a fast rate of vapor flow is maintained between the site of vaporization and the site of its condensation without impeding the flow or causing it to undergo a significant pressure drop between those sites, thereby distinguishing it from the prior art in which wire mesh demister screens are utilized.

Furthermore, in the preferred form of the "flash tube" or "vapor vortex tube" shown in FIG. I, where it comprises a straight tube with a spirally twisted ribbon baffle narrower than the inside diameter of the tube, secured therein in an axial position so as to leave a free annular passage for the liquid phase adjacent to the inner wall thereof, it is found that advantageous two-phase flow conditions are thereby created. For instance, it provides that the vapor pressure gradient is smaller and phase separation is more effective than with a similar twisted ribbon baffle that spans the full inside diameter of the tube, other factors being comparable. In fact, there exists a basic difference in the flow patterns of a fluid system through a tube containing a spiral twisted baffle of a width either equal to or less than the inside diameter of the tube. With a full width baffle, fluid flow is essentially comparable to flow through two separate conduits wound spirally around one another, i.e., flow around two separate axial centers of symmetry, whereas flow through the preferred form of the flash tube or vapor vortex tube of this invention has a single axial flow symmetry, i.e., a single vortex. This vortex flow is imposed mainly upon the vapor phase by a spiral baffle that, in its preferred form, leaves a free annular space for liquid flow in continuous contact with the tube wall; but process flexibility, regarding the degree of phase mixing or phase separation, can be achieved by varying the width and pitch of the arcuate shaped baffle. Thus a wider baffle, especially one that extends into the annular liquid imposes an increased vapor pressure gradient and is less effective as a phase separator but may be utilized when a greater degree of two-phase contact within the tube is desirable.

When utilized in vertical orientation the flash tube or vapor vortex tube of this specification may be utilized with either cocurrent or countercurrent flow of a liquid and a vapor or gas phase.

It should be noted that the vapor pressure gradient through the vapor vortex tube with the preferred spiral baffle insert is smaller when the tube operates, as described, in vertical orientation than when it operates similarly in a horizontal orientation.

The evaporation and distillation process and apparatus described herein provide for the increased production rate of potable water from sea water, at greater economy than taught by the prior art, mainly on the basis that higher vapor flow rates than heretofore practicable are thereby utilized. In addition, the present invention allows vaporization to be effected with greater thermal efficiency by disposing the evaporating liquid as a continuous thin layer as it flows through a flash tube or a distillation tube and also by the mode of recycling of the heat within a multi-stage series of evaporators.

One of the purposes of this invention is to provide a method and apparatus for the flash evaporation of a liquid distilland by utilizing a flash tube or vapor vortex tube in generally horizontal orientation, with vapor and liquid discharge therefrom tangentially into a cyclone separator vessel as shown in FIG. II and FIG. III. The distilland enters the inlet end of the flash tube and is partially vaporized during its passage therethrough under a pressure gradient whereby the vapor phase flow therethrough is accelerated to a sufficient speed to bring about the removal of liquid droplet entrainment from the vapor phase by centrifugal forces imposed upon the vapor phase flow by curved structure either within the flash tube or of the flash tube wall. The swirling action of the liquid phase collected within the cyclone separator may be utilized to enhance the rate of heat transfer to it from a fluid caused to flow in heat exchange relationship therewith through a conduit associated with the walls or base area of the cyclone separator vessel. The swirling action in the vapor phase within the cyclone separator vessel may be transmitted into the condenser so as to enhance the rate of vapor condensation on the condenser surface. A major advantage of this invention over the prior art results from the high rates of vapor flow allowed by entrainment removal through centrifugal action within the flash tube, thereby eliminating the requirement of entrainment removal by the demister screens commonly used in the prior art. Such demister screens, usually consisting of a layer of knitted wire or mesh inserted across the flow path of the vapor, impose a vapor pressure drop and a limit on the flow speed of the vapor through it that varies with operating temperature and pressure and is of the order of 29–30 feet per second. The high vapor flow rates provided for by the use of the flash tube of this invention allows for the use of relatively small evaporation units as compared to those of a conventional process of the same production capacity. Furthermore, the flash tube is an efficient flashing device since vaporization takes place from liquid droplets therein and from a thin layer of the liquid in turbulent flow in contact with the wall of the flash tube. This elongate, arcuate, two-phase flow channel is, besides being a phase separation device, also a means for allowing the liquid and vapor phases to approach a state of temperature equilibrium by the time they are ejected from the flash tube thereby enhancing the thermal efficiency of evaporation. The flash tube can be constructed in a variety of shapes and sizes, consisting of, for instance, either a straight conduit with an insert having arcuate structure or of a curved conduit or of both and may be located entirely within the evaporator vessel or entirely or partially outside of it and connected therewith so as to discharge the liquid and vapor at any suitable angle thereinto above the liquid collected within the vessel. The flash tube may also be utilized as a heat exchanger by passing a fluid in heat exchange relationship with the two-phase flow system therein through a suitable conduit enclosing the outside wall of the flash tube as shown in FIG. I.

It is common practice in horizontal multi-stage flash evaporation to allow interstage temperature differences of about 3° F. or more, providing thereby sufficient corresponding interstage vapor pressure differences to cause the liquid to flow at a sufficient rate from one stage to the next, i.e., to pump the liquid from one stage to the next. This limits the number of stages that can be used within a given over-all temperature range which in turn limits the maximum thermal efficiency attainable in such a multi-stage flash process.

One of the aims of this invention is to provide for the use of the flash tube or vapor vortex tube principle, as defined above and hereinafter in the Multi-Stage Cascade Flash Tube Evaporation Process and the Apparatus therefore illustrated by FIG. IV and FIG. V, that obviates both of the limiting conditions of vapor phase flow and interstage temperature steps mentioned above. The cascade evaporator provides a method and apparatus whereby high rates of vapor flow are maintained with and vapor phase demisting concomitant with and at the site of vaporization within the flash tubes. The vapor phase flow is thus not impeded between the site of vaporization and the site of its condensation at the condenser surface and it can be considerably in excess of the vapor speeds of flow allowable with wire mesh demisters. Another aim of this invention is to provide for gravity flow of the liquid distilland from stage to stage through flash tubes that are in vertical orientation in the cascade evaporator but may also assume a different orientation. The minimal interstage vapor pressure difference and temperature difference is therefore not determined by an interstage distilland pumping requirement usual in the horizontal arrangement of multiple flashing stages. Gravity flow of the distilland thus allows greater freedom in the choice of the number of stages in a multistage cascade flash distillation process and thereby allows for the attainment of greater thermal efficiency. The available or selected interstage temperature and vapor pressure differences are, in this invention, mainly utilized to create two-phase flow conditions that are favorable for vaporization, phase separation and thermal equilibration within the flash tube and to dispose the distilland on the wall of the flash tube as a continuous layer or film to provide that heat for vaporization can be added to this distilland layer, through the tube wall, with a high thermal efficiency. Several advantages gained by this process whereby vaporization and phase separation are controlled to occur mainly within the flash tube is that evaporation takes place from liquid drops and from a thin layer of liquid in turbulent or in laminar film flow; vaporization therefore proceeds to relative completion, i.e., a condition of thermal equilibrium between the two phases is approached at the outlet end of the flash tube. The elimination of demister screens from the vapor flow path allows fast vapor phase flow and high distillate output. The size requirements of the flash chamber are reduced by the fast vapor phase flow and by the state of near thermal equilibrium of the two-phase flow when discharged from the flash tube into the flash chamber. The use of flash tubes allows for the gainful recovery of heat from distillates produced at the high temperature stages of a multi-stage flash distillation plant by passing these distillates in heat exchange relationship with the flash tubes toward the low temperature range of the series. The series of stages of a multi-stage cascade flash evaporation plant may be used in any orientation of vertical displacement from the conventional horizontal arrangement, for instance they may be placed stepwise up a hillside adjacent to a beach or they may be stacked vertically, thereby saving in construction materials and land cost.

Flash evaporators utilizing flash tubes are well suited for use on board ocean vessels because of a high ratio achieved of distillate output to size. In such applications the flash-down temperature per stage may be relatively large and the number of stages employed in series may be small, thereby sacrificing some thermal efficiency but gaining much in vapor flow rate and distillate production rate.

Another purpose of this invention is to provide a method and apparatus for the use of the two-phase flow and vaporization principles of the flash tube or vapor vortex tube as defined above and hereinafter in the Two-phase Flow Control in Long Tube Vertical (LTV) Evaporators or Distillers illustrated in FIG. VI, FIG. VII and FIG. VIII. It is common practice to operate long tube vertical evaporators or distillers in multi-effect series with either upward or downward flow of the distilland through long distillation tubes and with either forward or backward feed flow through the series. Each effect usually consists of a bundle or multiplicity of parallel vertical distillation tubes, of which only a few are shown in FIG. VI, surrounded by a steam chest within a vertical cylindrical vessel. The distilland is either introduced into these tubes at their top ends for downward, falling film flow under the influence of gravity, or at their bottom ends for upward flow. The distilland is in either case partially vaporized while flowing through the distillation tubes; heat of vaporization is provided by the condensation of vapor, from a previous or a hotter stage or from a vapor compressor or from a steam boiler, on the outside walls of the distillation tubes extending through the steam chests. The upward flow system is generally more trouble free in operation because of the ease of equal distilland flow distribution among the distillation tubes. However, the downward flow system offers greater thermal efficiency and productivity but it is subject to operating problems resulting from the difficulty of achieving equal distribution of distilland among the distillation tubes, from scaling of the tube inside walls due to entrainment of liquid within the vapor phase and other uneven flow patterns, from vapor pressure drop through the tubes arising from such liquid droplet entrainment and from low thermal efficiencies due to uneven liquid flow patterns, drying of the tube inside surfaces, scale deposit on the tube surfaces, entrainment of liquid in the vapor phase core and other flow problems. These operating problems that are especially troublesome in the low temperature effects of a multi-effect series of LTV distillers may be overcome by controlling the flow pattern of the two-phase flow system through the tubes.

The use of the flash tube or vapor vortex tube principles, as summarized previously in the two-phase flow control for LTV evaporators and distillers, particularly with downward distilland flow, but also applicable in different tube orientation or distilland and vapor flow orientation obviates several of the operating problems mentioned above. The flash tube or vapor vortex tube invention as applied in long tube vertical distillation of sea water in downward film flow consists in its preferred form of inserting a spiral twisted ribbon baffle narrower in overall width than the inside diameter of the distillation tube therein and securing it in a central axial position within the tube thereby to leave an annular free passage for the distilland flow as a film or layer in contact with the tube wall. The baffle may be held under tension by securing it at the top and bottom ends or it may be positioned by occasional spacer tabs attached at the edge of the baffle and touching the wall of the tube.

The function of the spiral baffle as a two-phase flow control device is to impose a corkscrew or vortex motion in the vapor phase flow, thereby to remove liquid droplet entrainment or saline spray from the vapor phase by the centrifugal action imposed thereon and to return this entrainment to the liquid layer flowing in contact with the wall of the tube. Entrainment within the vapor phase flow has the effect of imposing a vapor pressure drop through the vapor column within the distillation tube. If entrainment is prevented or removed, this vapor pressure drop disappears and thereby increases the temperature gradient ($\Delta T$), measured between the temperature of the vapor condensing on the outside of the tube wall (steam side) and the temperature of the evaporating liquid layer, available for vaporization. Effective removal of entrainment from the vapor phase flow will therefore increase the vapor or distillate output from a tube that operates under particular over-all temperature and vapor pressure conditions. It must be pointed out that the imposition of centrifugal forces upon the vapor phase, or the continuous deflection of the direction of flow thereof by the spirally twisted baffle, also imposes a certain vapor pressure gradient upon the vapor phase down the length of the baffled tube, but this is of a predictable magnitude and controllable by varying the width, length and pitch of the spiral baffle. The vortex motion of the vapor phase flow sweeps over the liquid phase and, through interfacial shear, imposes a slight corkscrew or vortex motion in the liquid flow down the tube. This sweeping action of the vapor phase flow upon the liquid phase helps to maintain an unbroken film of liquid over the entire tube wall thereby to prevent channeling of the liquid layer and the appearance of dry streaks down the tube wall. Entrainment removal from the vapor phase by imposing vortex flow thereon thus ensures that virtually the entire liquid phase remains in contact with the tube wall, thereby subjecting the entire liquid phase to vaporization as it flows down the tube so as to ensure that overconcentration of a portion of the liquid phase, leading to scaling, does not occur. Furthermore, since the liquid phase follows a slight corkscrew path down the tube wall, heat transfer from the wall to the liquid is increased because of the increased contact length with the tube wall. The important effects of the imposition of centrifugal forces or vortex flow on this two-phase flow system are therefore to remove entrainment from the vapor phase and to keep the entire tube wall wet with liquid so as to prevent dry spotting and scaling of the tube wall. Another advantage of the use of the flash tube or vapor vortex tube principle in long tube vertical distillation is that since liquid entrainment in the vapor phase is effectively eliminated thereby, the rate of flow through the tubes may be increased over the flow rates acceptable in the present state of the art without entrainment carry-over into the distillate becoming objectionable. Another advantage of this flow control device is that variation of the length, width and pitch of the spiral inserts provide flexibility whereby to achieve the best flow and temperature conditions for each effect in a multi-effect series of distillers without having to use a wide variety of tube sizes to achieve such optimal process conditions. Some of the effects may require only a short length of such a baffle insert at the top end of the tube as shown in FIG. VII to remove from the vapor phase the liquid spray released with the initial flash-off of vapor due to the pressure drop at the entrance to the distillation tubes and to dispose the liquid phase in an even layer on the tube wall. Subsequent vaporization down the distillation tubes of the high temperature effects is usually not conducive to excess entrainment of liquid droplets in the vapor formed. The vapor phase speed of flow increases but its density decreases through the multi-effect series from the high to the low temperature effects whereas the liquid phase density changes comparatively little. The required pitch and width of the spiral baffles for the low temperature effects may therefore be progressively smaller as the operating temperatures of the evaporators decrease.

Another purpose of this invention is to provide a method and apparatus, as in FIG. IX, for the use of the vapor vortex tube principles in fractional distillation of liquids consisting of several components having different individual boiling points or vaporization characteristics. Heat of vaporization of a liquid flowing downward within a fractionation column is usually provided by hot vapor flowing upward in countercurrent interphase contact with the liquid. A portion of the distillate is allowed to flow back down the column and a rising temperature gradient is established downward through the column so that liquid is repeatedly vaporized, the vapor rising upward and condensing partially while vaporizing liquid higher up the column, thereby to enrich the vapor higher up the column with respect to lower boiling, more volatile components and thus fractionate or rectify the charged distilland. Fractionation columns of relatively small cross section are usually packed with inert solid materials designed to provide a large total surface area for increased liquid-vapor interphase contact and equilibration, whereas large diameter fractionation columns usually contain a diversity of perforated horizontal trays that provide for even cross-sectional flow and wherein a shallow layer of liquid collects. Vapor-liquid contact is usually provided by upward flow of vapor through the perforations in the trays. Phase separation, or removal of liquid droplet entrainment from the vapor phase usually depends upon gravity separation; the rate of upward flow of the vapor phase is therefore limited to values that allow liquid droplets to settle down and thus be removed from the vapor phase. Fast vapor phase flow rates through such columns can result in increased liquid droplet entrainment because of interfacial shear, atomization at vapor orifices, bubble collapse or vapor blowing through a curtain of cascading liquid. Although such a high degree of dispersion enhances thermal equilibration between the two phases it also complicates phase separation, required before the vapor phase contacts reflux liquid higher up in the fractionation column. The major advantage of the use of the vapor vortex flow tube of this specification in fractional distillation depends upon the fact that high flow rates are quite compatible therewith and is utilized to advantage; high rates of fractionation are thus achieved with a column of particular dimensions. The spiral baffle of the vapor vortex tube promotes thermal equilibration of two phases in countercurrent flow under a continuous vapor pressure gradient and effects phase control including controlled interphase contact and phase separation. In a preferred embodiment shown in FIG. IX a multiplicity of vapor vortex tubes, of which only seven are shown, extend through a horizontal tray within a cylindrical shaped distillation column. The lower section of each vapor vortex tube is designed to function as an interphase contact and thermal equilibration area while the upper section functions as a phase separation or demisting area. This flow differentiation depends upon the position of the liquid inlet slots slightly above the position where the tubes are secured to the tray and upon selecting a spiral baffle of appropriate width, pitch and length for each of these two sections in addition to flow and temperature conditions established within these tube sections. This fractionation method offers flexibility in design to cope with liquids of a wide variety of characteristics. Design variables include vortex tube number, diameter and length, the portion above and below the tray through which they extend, dimensions and orientation of liquid inlet slots cut through the tube wall, the width, pitch and length of the spiral twisted baffle inserted within the vortex tubes which control the degree of phase mixing, interphase contact and phase separation. In addition, the usual process variables including liquid flow rates, reflux ratios, the number of trays used and the vertical distance between them, vapor phase flow rates, temperature intervals and profiles along the distillation column length also apply here.

The construction and operation of the preferred form of the "flash tube" or "vapor vortex tube" of this invention is illustrated in FIG. I and defined by the following description. The preferred form of an arcuate baffle 1 is made from an elongate ribbon of sheet metal or other suitable material by twisting it into a smooth spiral or helix of suitable or variable pitch. The ribbon may have a uniform or variable width or may be wedge shaped. The spirally twisted baffle is inserted into a suitable conduit or tube 2, that has an inside diameter in excess of the width of the baffle, and is secured in an axial position therein. An annular gap is thus provided between the tube wall and the edge of the spiralled baffle, and the axis of the tube coincides with the twist axis of the baffle. The baffle 1 may be secured in the axial position inside the tube 2 by a variety of means, for instance, it may be held in place by several pairs of spacer tabs 3 attached at opposite edges thereof at suitably spaced intervals and touching the inside wall of the tube 2, or the baffle 1 may be placed under tension and secured at each end thereof so as to hold it in an axial position within the tube, for instance with suitable spacer tabs 3. The inlet 4 to the tube 2 may be provided with a valve or another suitable flow control device, for instance, one that provides an annular inlet gap adjacent to the tube wall; or when the vapor vortex tube is utilized in vertical orientation, liquid distilland may be caused to flow thereinto over the upper edge thereof or through suitable horizontal slots in the wall thereof. The opposite outlet end 5 of the vapor vortex tube is usually open. In addition, but not essential, provision may be made for heat exchange with the tube wall 2 by extending it through a suitable heat exchanger vessel which may have the form of a tubular jacket 6 having inlet 7 and outlet 8 conduits connected thereto. The length and diameter of the tube 2 as well as the length, width and pitch of the spiral baffle 1 are variable dependent on different process conditions such as the temperature level at which the vapor vortex tube operates, the temperature and pressure gradient maintained between the inlet 4 and outlet 5 thereof, the fluid flow rate or flow rates through the tube 2 and physical properties of these fluids.

In operation a fluid system consisting of gas and/or liquid flows through the vapor vortex tube shown in FIG. I from a relatively higher pressure provided at the inlet 4 thereto to a relatively lower pressure maintained at the outlet 5 thereof. The curvature of the twisted baffle insert 1 imposes vortex flow upon the fluid flow system by the continuous deflection of its direction of flow as shown by curved arrows 9 into a corkscrew route within the tube 2. This vortex flow imposes centrifugal forces upon the fluid system, in the radial direction, which causes separation of the denser phase of a multi-phase fluid system therefrom and concentrates or disposes it adjacent to the wall of the tube 2 in an annular cylindrical layer flowing through the tube. It also imposes a continuous pressure gradient on the fluid flow system. The separated or partially separated phases may be collected at the open outlet end 5 of the tube 2 by a variety of means, for instance, by one of several forms of centrifugal separation techniques such as by injecting them into a cyclone separator, by scooping the inner phase "core" out through the cylindrical "curtain" of outer phase through a suitable, curved conduit, by parting or deflecting the "curtain" of outer phase with a suitable deflector thus leaving a clear exit route to one side for the inner phase "core," or by a form of gravity separation.

When a liquid distilling having a sufficient heat content and temperature enters the inlet 4 under the influence of a sufficiently lower pressure maintained at the outlet 5 thereof the liquid flashes or vaporizes partially, utilizing the heat contained in the liquid as the source of heat of evaporation and thereby lowering the temperature and vapor pressure of the unevaporated residual liquid. The two-phase system of residual liquid and vapor thus produced is projected through the vapor vortex tube or flash tube while further partial vaporization occurs because of the gradual fall in vapor pressure through the tube length. The spiral baffle insert 1 induces vortex flow in the two-phase system which causes heavier liquid phase, including liquid droplets entrained in the vapor phase, to be centrifuged radially outwards toward the tube wall 2. The vapor phase flows through the tube 2 at greater speed than the residual liquid and, through shear action at the vapor-liquid interface, maintains the liquid as a film on the inside wall of the tube 2 flowing in a spiral motion of more gradual pitch than that of the vapor phase flow. Thus the vapor, freed from most of the previously entrained liquid droplets, is ejected from the inner area of the open outlet end 5 of the vapor vortex tube at relatively high speed of flow and at a temperature close to thermal equilibrium with the residual liquid which emerges from the outlet 5 at a relatively slower speed of flow and in the form of a curtain or an annular layer in contact with the tube wall. It should be noted that some entrained liquid phase or liquid droplets are removed from the vapor phase by striking the surface of the baffle or the surface of the liquid annular layer and are thus removed from the vapor phase flow and returned to the liquid layer on the tube wall. This may especially be observed near the entrance section 4.

Heat of evaporation of the residual liquid flowing in thin layer contact with the tube wall may also be provided by additional means. It may for instance be provided through the tube 2 wall by passing a fluid in heat exchange relationship with the vapor vortex tube or flash tube through the inlet 7 and outlet 8 of a heat exchanger jacket 6; for instance hot vapor may thus be caused to condense on the outside wall of the tube 2. The heat of evaporation may also be provided through the vapor phase, for instance it may be provided, to a film of liquid flowing downward in a vertical vapor vortex tube, by having a relatively hot vapor phase flowing upward in a vortex in interphase shear contact with the liquid film.

The construction and operation of two preferred forms of the flash tube or vapor vortex tube evaporator unit is ilustrated in FIG. II, FIG. III and by the following description.

The evaporator units illustrated in FIG. II and FIG. III respectively, comprise generally cylindrical cyclone separator vessels 10, 11 connected with arcuate shaped flash tubes 12, 13 having liquid distilland inlets 14, 15 at one end and whose open opposite outlet ends 16, 17 discharge the liquid and vapor intermediate of and tangentially within the cylindrical vessels and above the liquid collected in the vessel 18; outlets 19, 20 for unevaporated liquid are provided in the conical 21 or disc 22 shaped base of the cylindrical vessels 10 and 11 respectively. Tube condensers are located in the upper portions of the cylindrical vessels and may consist of helically or spirally coiled tubes 23, 24 or several such tubes in concentric or other combinations and connected with coolant fluid conduits 25, 26 through the conical or disc shaped top ends 27, 28 or through the side walls of the cylindrical evaporator vessels. Wide, circular vapor ports 29, 30 are provided communicating the upper and lower portions of the cylindrical evaporator vessels 10, 11 and providing for the transmittal of vortex flow in the vapor phase from the lower section of the vessels into their upper, condenser sections. This vortex flow maintained within the condenser enhances the rate of condensation. The vapor ports 29, 30 are located centrally through disc shaped splash plates 31, 32 which divide the two sections of the cylindrical vessels and which also may serve as a collecting trough 33 for condensate (see FIG. III) communicating with a suitable distillate outlet conduit 34. The condensate may alternatively (see FIG. II) be collected in a spiral shaped trough 35 positioned underneath a condenser tube 23 of similar contour and thence conveyed to a distillate collecting funnel 36 and removed from the vessel through a suitable conduit 37 extending through the base or through the side of the vessel. Non condensable gas and air are evacuated from the vessels through suitable conduits 38, 39 located in the top of the condenser sections, to which are also connected means for maintaining a suitable vapor pressure within each evaporator. A base heat exchanger 40 (FIG. II) for passing fluid in heat exchange relationship with the liquid collected 18 in the vessel 10 may be incorporated into the conical base 21 area or into the lower side wall of the vessel. Swirling or vortex flow maintained in this liquid enhances the rate of this heat exchange. The base heat exchanger may comprise a second conical plate 41 in outwardly spaced relationship with the base conical plate 21 and connected with suitable inlet 42 and outlet 43 conduits. A baffle may be positioned within the heat exchanger 40 to control the heating fluid in a spiral upward flow path for enhanced heat exchange with the liquid 18 collected in the vessel 10. Heat of vaporization may also be added to the liquid flowing through a flash tube by enclosing the flash tube wall within a suitable conduit and by passing a fluid in heat exchange relationship therewith through this conduit. The level of the liquid collected in the vessel 10 is controlled by a distilland inlet control valve 44. The vapor pressure within the vessels are maintained at a suitable value sufficiently below the saturation vapor pressure of a liquid distilland entering a flash tube through the inlet thereto. Coolant fluid flow through the condensers and distillate removal from the condenser sections are also controlled at suitable rates. The evaporators shown in FIG. II and FIG. III may be used in multi-stage series connection or singly.

The arcuate shaped flash tubes 12, 13 shown may be replaced with straight flash tubes having arcuate shaped baffles inserted therein, such as the spirally twisted ribbon baffle shown in FIG. I, and discharging liquid and vapor at a tangential angle into the cyclone separator vessels and above the liquid collected therein.

The flash tube or vapor vortex tube is designed to utilize the fall in vapor pressure (or the increase in vacuum) from stage to stage in a multi-stage series of evaporators to impart a sufficient swirling motion in both the vapor phase and the liquid phase collected in the cyclone separator vessels by discharging tangentially and above the level of this liquid. This diameter, length and curvature of the flash tube of a particular evaporator unit depends on the temperature at which the evaporator is designed to operate, on its dimensions and on the drop in temperature experienced by the evaporating liquid as it passes through the flash tube. This drop in temperature corresponds to a particular drop in the vapor pressure of the liquid passing through the flash tube. The vapor pressure drop associated with a unit drop in temperature is relatively larger at the higher than at the lower temperature end of a multi-stage series of evaporators. The temperature and pressure at which the evaporator operates determines the volume to which a unit weight of vapor will expand, partially inside the flash tube and finally in the body of the evaporator. These corresponding pressure drops and volume increments complement one another in their effects on the operation of the flash tubes of a multi-stage series of evaporators. The diameter, length and curvature of a flash tube may therefore change from one evaporator to the next of a series so as to produce a sufficient vapor (and liquid) flow speed and it will depend on the operating temperature. The main purposes of the flash tube are thus to effect controlled vaporization of the distilland, to allow fast flow rates, to remove entrained liquid phase from the vapor phase by centrifugal force, both within the flash tube and within the cyclone separator vessel, and also to enhance the rate of heat exchange at the condenser surface, at the base heater surface or at the flash tube surface.

In operation a liquid distilland enters the flash tube or vapor vortex tube through an inlet 14, 15 and flow control valve 44, 45 because the vapor pressure in the evaporator vessel is maintained at a value sufficiently lower than the vapor pressure of this liquid distilland. As it enters and flows through the flash tube vaporization of flashing of the liquid occurs because of the pressure drop thereon and continues until the vapor pressure (and temperature) of the liquid approaches an equilibrium condition with the vapor pressure maintained within the evaporator vessel. Vaporization is designed to take place mainly in the flash tube and is associated with a gradual fall in the liquid vapor pressure and temperature as it proceeds through the flash tube. The vapor thus released expands under the influence of this pressure gradient thereby propelling vapor and entrained brine at an accelerated speed through the remaining length of the flash tube. Evaporation is gradual conforming with the gradual fall in pressure through the flash tube. The vapor pressure profile or gradient through a flash tube is complex and depends on several factors including the temperature level of operation and over-all temperature drop, the flash tube dimensions and curvature and the flow rates of liquid and vapor, but, in general, a relatively large initial pressure drop of relatively steep gradient is followed by a gradually diminishing further pressure drop. The vaporization rate of the liquid corresponds with this gradient, and entrainment of liquid in the vapor thus occurs mainly initially at the entrance to the flash tube allowing it to be removed from the vapor phase by centrifugal action as it proceeds through the flash tube. In addition, since the over-all pressure drop is gradual, rather than sudden as in nozzle discharge, the total amount of spray released into the vapor phase is minimized. Turbulence in the brine in thin layer flow through the flash tube ensures a relatively complete removal of vapor from it. There also exists a tendency for the brine to spread as a film over the entire flash tube wall surface as it flows therethrough. This enhances evaporation, removal of entrained liquid droplets from the vapor phase and temperature equilibration between the two phases. Separation of entrained liquid droplets from the vapor phase starts inside the flash tube where, due to the curved flow channel provided thereby the more dense liquid phase is centrifuged out of the vapor phase toward the outside wall of the flash tube. This phase sepration is continued within the evaporator or cyclone separator vessel.

The design and operation of the preferred form of a multi-stage cascade flash tube evaporator is illustrated by the flow scheme, through three consecutive evaporator stages intermediate in a multi-stage series, shown in FIG. IV and FIG. V and by the following description. In a preferred form each stage of such a multi-stage series of evaporators 46, 47, 48 comprises a rectangular shaped vessel and may be in vertical stacked or stepped orientation with respect to one another. Liquid distilland enters each stage through the inlet sections 49 of each of a bank of vertical flash tubes 50 located adjacent to a vertical end wall of each vessel at a rate of flow controlled by suitable valves, for instance a bank of inverted cone valves 51 attached to a floating bar as shown 52, designed to maintain the level of liquid collected in a previous stage in the series within a suitable range. The inlet ends 49 of the flash tubes or vapor vortex tubes 50 are attached to the top side of the evaporator vessels 46, 47, 48 thus communicating each vessel with the previous one in the series, and are suspended within the vessels with their open ended outlet ends 53 intermediate of the vessels and above the level of liquid collected in the vessels 54. Secured in an axial position within the flash tubes 50 are arcuate shaped baffles 55 made, in their preferred form, by twisting an elongate metal ribbon narrower in width than the inside diameter of the flash tubes 50 into a smooth spiral or helix. Suitable vapor phase flow deflector baffles 56 may be installed in the evaporator vessels 46, 47, 48 designed to aid in the gravitational and centrifugal separation of liquid droplets from the vapor phase as it flows toward the condenser. A suitable condenser, for instance one comprising horizontal tubes 57 spanning the width of the evaporator vessels and communicating with coolant fluid distributor boxes 58 on either side of the evaporator vessels is associated with each evaporator vessel and may be located therein with a condensate collecting trough 59 located underneath the condenser tubes and spaced sufficiently high above the liquid collected in the vessel to allow a sufficiently wide passage for the vapor. The distillate pumps 60 shown may be replaced by gravity flow means. The banks of flash tubes 50 of some of the evaporator stages, especially those toward the low temperature (bottom) end of the series may be enclosed or incorporated into suitable heat exchanger means, for instance by extending them through a suitable vessel 61, having inlet 62 and outlet 63 conduits connected therewith as shown located within the evaporator vessel 48.

Since the pressure difference between the inside and outside of the flash tubes is small it leaves a wide choice of material for construction of the flash tubes decided by economy and erosion-corrosion properties rather than mechanical strength. The bank of flash tubes may also serve as the end wall of the rectangular evaporator vessel and a bank of flash tubes may be half formed by vertical corrugations in a continuous sheet of metal with a similar corrugated continuous sheet forming the remaining half of the bank of flash tubes.

When the vertical stepped orientation is used the middle stage shown 47 is turned through 180° around a vertical reference axis and moved over to the right. The bottom stage 48 is also moved over but at twice the distance of the middle stage 47 so that a staircase orientation upward to the left is obtained through the series of stages thus allowing the liquid distilland to cascade stepwise from stage to stage. The distilland follows a zigzag course downward through stages when the vertical stacking orientation is used.

In operation the vapor pressure in each of the vessels of a multi-stage cascade flash tube evaporator is established at a suitable level in a stepwise decreasing series from the topmost, hottest evaporator stage to the bottom, coldest evaporator sage. The liquid distilland, for example cold sea water, is pumped upward through the series of interconnected tube condensers in a zig-zag flow pattern from stage to stage through the series of evaporator vessels as shown by arrows in FIG. V. Heat of condensation is thus absorbed from the vapor condensing in each evaporator vessel and the temperature of the sea water feed is gradually increased. The hot sea water thus emerging from the topmost, highest temperature evaporator is passed in heat exchange relationship with a suitable source of heat to thereby raise its temperature to a suitable maximum level and thereafter passes through the inlet control valves 51 of the bank of flash tubes 50 of the topmost, hottest evaporator stage. The vapor pressure within this evaporator vessel is maintained at a level sufficiently below the vapor pressure of the hot sea water feed entering the bank of flash tubes thereof to cause it to flash off vapor which is propelled downward through the flash tubes under the vapor pressure gradient existing therein and under force of gravity with a sufficient speed of flow. The vapor phase flow is deflected into a spiral route by the arcuate shaped baffle inserted into the flash tube thereby creating a vortex flow within the vapor phase that separates liquid phase therefrom and disposes it on the flash tube wall in a thin layer or in falling film flow. Liquid phase impinging upon the arcuate baffle is also deflected to the liquid layer on the wall of the tube. The vortex flow imposed upon the vapor phase core effects the liquid film flow through shear action at the vapor-liquid interphase. It sweeps the liquid film along in a slight spiral route down the tube wall thereby distributing the liquid layer, preventing dry streaks on the tube wall and promoting vaporization of the liquid. The imposition of vortex flow on the fluid system and phase separation by centrifugal forces within the flash tube creates a gradual vapor pressure gradient therethrough thus causing evaporation of the brine to take place gradually as it passes through the flash tube. A large portion of the vapor, however, flashes off at the entrance to the flash tube with a considerable release of spray into the vapor phase. The elongate, arcuate shaped flow channels provided by the flash tubes provide for the effective removal of this spray from the vapor phase and promote temperature equilibrium of the two phases. The liquid phase emerges from each flash tube as a continuous annular curtain which may be parted on one side by a suitable deflector device to allow the vapor phase core to escape sideways through the parting without re-entraining liquid droplets at this point. Liquid phase flow is indicated by solid arrows and vapor phase flow by open arrows in FIG. IV. The vapor phase then flows horizontally across the length of the evaporator vessel over the liquid collected therein to allow the removal of entrained liquid droplets from the vapor phase by gravity separation. The vapor phase flow may then be deflected up and backward through a U-turn and again upward toward the condenser by a suitable baffle plate 56 or other means thus providing further centrifugal and gravitational means for the removal of liquid droplets from the vapor phase. Liquid droplets thus removed impinge upon the side wall, on the bottom of the condensate trough 59, on the outside walls of the bank of flash tubes and on the baffle plate 56 and are returned to the liquid collected in the evaporator by gravity flow, for instance through suitable drainage holes 64 provided therefor. The vapor phase, thus freed from brine entrainment, may then be allowed to impinge directly upon the bank of condenser tubes 57 with considerable flow speed without first passing it through wire mesh demister screens which impose both a pressure drop and a limiting speed of flow on the vapor phase. The condensate is collected in a suitable trough 59 and removed from the evaporator vessel by a suitable pump 60 or by gravity flow. The residual liquid or brine emerging from the flash tubes falls free under gravity and collects in the bottom of the evaporator vessel. Further evaporation takes place as it falls free in a curtain and thereafter as it flows in a collected layer across the length of the vessel toward the inlet area of the next evaporator stage located in the bottom of the vessel. The level of the liquid 54 collected in each evaporator vessel is controlled within a suitable range by the inlet valves 51 of the next colder evaporator stage in the series. Evaporation from this liquid layer may be enhanced by controlling it at a shallow depth or by sloping the bottom of the evaporator vessel slightly downward from the flash tube end to the exit end thereof, especially when the multi-stage series of evaporator stages are stacked vertically. Heat of evaporation withdrawn from the distilland liquid phase flowing through the flash tubes and through the evaporator vessel is thus transferred via the vapor phase to the sea water feed flowing through the condenser tubes under flow conditions that favor high thermal efficiencies and at high rates of flow.

The liquid distilland or hot sea water feed is thus induced to cascade from stage to stage, through banks of flash tubes within each stage, in a zig-zag flow pattern while its temperature and heat content diminishes in steps due to the removal of heat of evaporation and vapor in each successive stage. This heat of evaporation is transferred with the vapor to the condensers in each stage and thus to the coolant fluid or sea water feed being pumped upward through the series of condensers. The heat contained in the condensates, especially those from the upper, higher temperature stages, may be recovered advantageously by flowing the condensates through suitable heating jackets, enclosing or including the side walls of the flash tubes in evaporators at the lower temperature end of the series of stages, in heat exchange relationship with the liquid distilland or brine flowing downward in contact with the inside walls of these flash tubes. Brine pumped from the lowest temperature (bottom) stage is in part discarded and in part recirculated upward through the series of condensers mixed with cold sea water feed in such proportions as to keep the concentration of solutes in the recirculated feed brine within acceptable limits.

The construction and operation of the two-phase flow control device for LTV evaporators or distillers are illustrated in FIG. VI, FIG. VII and FIG. VIII and by the following description. The construction and operation of the LTV distiller is old but the insertion and use of vapor vortex flow inducing baffles within the distillation tubes is new. These inserts are effective for entrainment removal from the vapor phase and for insuring a continuous and even distribution of liquid distilland on the tube surface; they also enhance the thermal efficiency and the rate of productivity of the LTV distiller. The general construction details of an LTV evaporator vessel shown, comprising a distilland inlet tube 65 and an inlet section 66 communicating via perforations 67 through a distributor plate 68 with the tube inlet section 69 of a bundle of vertical distillation tubes 70 set in an upper 71 and a lower 72 tube sheet and extending through a suitable steam jacket section 73 having a steam inlet conduit 74 and a distillate outlet 75 thereto and whose open bottom outlet ends 76 discharge into a vapor and liquid disengagement section 77 having vapor 78 and liquid 79 outlet conduits connected therewith, are old art. The spiral baffle inserts of this invention shown 80 are, in their preferred form, made from elongate strips of metal or another suitable material of an even or variable width, that is less than the inside diameter of the long distillation tubes 70 by twisting these elongate strips of material into a spiral or helical baffle of even or variable but smooth pitch and by securing these baffles 80 within the distillation tubes 70 in an axial position. Thus an unobstructed annular gap is left between the edges of the spiral baffles and the inside walls of the distillation tubes. The spiral twisted baffles 80 may be secured under tension at either end thereof or may be held in place in the tubes by suitably spaced tabs attached thereto and touching the tube walls. The elongate spiral baffles may be continuous down the tube length or discontinuous and of varied lengths determined by the flow and temperature conditions in a particular distiller. It may for instance be advantageous, under certain operating temperatures and with certain conditions of initial flash-off of vapor in the tube inlet (top) section 69, to use only a relatively short section of spiral baffle 81, as shown in FIG. VII, in the top end of the distillation tube and positioned axially therein with suitably spaced pairs of tabs 82 attached at opposite edges thereof and touching the distillation tube wall. The spiral baffle inserts may be used in conjuction with annular liquid inlet weirs and vapor phase core inlet devices 83, 84 shown in FIG. VII and FIG. VIII respectively. Both these devices may be in the form of short tubular sections fitting over or into the top of the distillation tube and whereto the spiral baffle 81, 85 may be attached. They provide horizontal liquid inlet slots 86, 87, whereby the liquid is placed on the wall of the tube as a falling film, and an axial vapor inlet port 88, 89, at the top ends of the distillation tube inlets 83, 84 respectively. The inlet device 84 shown in FIG. VIII provides a smooth annular gap 90 for placing the liquid layer on the tube wall and excess flow of liquid enters through the slots 87. The lower end of the short spiral baffle 81 may be shaped like a swallow tail 90 to direct liquid runoff from the baffle toward the liquid layer on the wall of the distillation tube.

In operation liquid distilland such as hot sea water entering the tube inlet section 69 through a suitable distribution device 68 under a vapor pressure drop will flash-off some vapor at that point and the two-phase system consisting of residual liquid distilland and vapor thus formed will enter the open inlet ends of the tubes 91 (FIG. VI) in downward flow. The spiral baffle insert 80 of this specification induces phase separation into a vapor phase core in vortex flow down the center area of the tube and disposes a liquid phase onto the tube wall in downward film flow. Liquid entrained in the vapor phase, especially as a result of initial vapor flash-off or resulting from turbulent flow over the edge into the tube inlet end 91, is separated from the vapor phase core, partly by impinging upon the arcuate shaped baffle and partly by centrifugal forces due to vortex flow imposed on the vapor phase core. This liquid is returned to the wall liquid layer so that the entire liquid phase is subjected to evaporation by contact with the heated wall of the tube 70. Liquid inlet weirs 83, 84 may also be used to aid in the initial separation of the vapor and liquid phases and to place the liquid on the tube wall as a falling film. Vapor flashed off initially is thereby directed downward into the tube as an inner core. The vapor phase in vortex flow sweeps over the liquid layer and, through shear action at the liquid-vapor interface imposes a slight cork-screw flow route on the falling film of liquid, thereby preventing vertical channeling which can lead to the occurrence of dry streaks and scale on the tube wall. The vortex flow induced in the vapor phase thus ensures that the tube wall is wet throughout its length, that the entire liquid phase is subject to evaporation and thus prevents scaling of the tube wall. The spiral baffle insert of this specification can also enhance the thermal efficiency of the LTV process especially in those effects that operate at lower temperatures where the considerable entrainment of liquid phase in the vapor results in substantial pressure drop through the distillation tubes. Elimination of such entrainment reduces this pressure drop and it thereby reduces the temperature gradient up the distillation tube which in turn provides that a greater temperature driving difference, $\Delta T$, measured between the condensing steam on the outside wall of the tube and the liquid flowing down the tube, is available to effect increased evaporation of this liquid. Brine entrainment in the vapor phase, or carryover, is one of the limiting factors on the rate of production of the LTV process as applied to sea water distillation. The use of the spiral baffle inserts of this invention in the distillation tubes of the LTV process may allow a considerable increase of brine and vapor flow rates before entrainment becomes a serious limiting factor. Furthermore, the use of the spiral baffle insert increases process design flexibility. Heat transfer efficiencies depend on many factors, for instance, $\Delta T$, liquid and vapor flow rates, liquid layer depth and flow characteristics (either laminar or turbulent, eddy flow), shear force at the liquid-vapor interface, the width and length of the tube and the pressure drop or gradient through the tube. Variations of the width, length, pitch and position of spiral baffle insert in the distillation tube can be used to design a more efficient LTV process than that provided by the existing art.

It is to be understood that the LTV evaporator shown may be operated in different ways; for instance, it may be operated as a single stage distiller with vapor compression as the source of heat of vaporization of the distilland or in multi-effect series with either vertical stacking of effects or in horizontal series connection or other multi-stage or multi-effect arrangements.

The construction and operation of a section through a fractional distillation column utilizing a preferred form of the vapor vortex tube for liquid-vapor thermal interaction, equilibration or for rectification and phase separation is shown in FIG. IX and is described below. One of a multiplicity of vertically spaced plates or tray 91 extending across the diameter of a cylindrical fractional distillation column 92 in vertical orientation is shown having a multiplicity of the preferred form of the vapor vortex tube 93 of this specification, of which only seven are shown, extending through it and secured therein at a position intermediate of the two ends of the tubes 93. Downcomer conduits 94, allowing crossflow of liquid over successive trays in a zig-zag route, communicate with liquid phase only from one tray 91 to the next. Liquid inlets 95 are provided to the vapor vortex tubes 93 and may be in the form of suitable horizontal slots 95 located intermediate of the tube length and at a position above the tray 91 but below the open top end 96 of the downcomer tube 94 extending vertically through the tray and secured thereto. Provision is thus made for a continuous flow of liquid phase into the vapor vortex tubes and for overflow or excess liquid to pass to a tray situated below through the downcomer tube whose open outlet end is submerged in the liquid collected in the tray below. Similarly, the open outlet end 97 of the downcomer tube from the tray above the tray 91 shown is positioned below the level of the inlet slot 95 to the vapor vortex tube 93. A suitable arcuate shaped baffle 98, which is, in a preferred form, made of an elongate ribbon of metal or other suitable material by twisting it into a spiral or helical shape, is inserted into the tube 93 and secured therein in a co-axial orientation. The width, length and pitch of the spiral baffle insert 98 can be varied to effect two-phase flow control as desired. The vapor vortex tube 93 is divided into two sections wherein different two-phase flow conditions are imposed. The section below the liquid inlet slot 95 functions mainly as a two-phase interface contact device wherein temperature and composition equilibration (rectification) between the two phases are effected under a continuous vapor pressure and temperature gradient. The section above the inlet slot functions mainly as a phase separator but further equilibration between these two separated phases occurs under a continued vapor pressure and temperature gradient therein. The sections of the vapor vortex tube 93 extending above and below the tray 91 and their diameters may therefore be varied independently to provide favorable process conditions. Variations of these tube section dimensions and the dimensions and pitch of their spiral baffle inserts may be varied in combinations to suit various process needs.

In operation liquid flowing across a tray 91 passes to the next tray located below, in part through the downcomer tube inlet 96 and in part through the inlets 95 to the multiplicity of vapor vortex tubes 93 extending through the tray. This division of the liquid flow may be varied for any liquid as desired by adjusting process variables such as the reflux ratio, the level of liquid allowed to collect above the inlet slots 95 to the vapor vortex tubes by adjusting the height thereabove of the downcomer tube inlet 96, the width and length of the slots 95 and the pressure gradient established through each vapor vortex tube by the size and pitch of the spiral baffle in interaction with the two-phase flow system through it. A liquid distilland is thus evaporated from a suitable vessel attached to or communicating with the bottom end of the fractional distillation column and the vapor rises through the series of vapor vortex tubes extending through the multiplicity of trays in the column to be rectified in two-phase contect with the reflux liquid flowing countercurrent therewith. A portion of the liquid entering the vapor vortex tubes through the slot 95 therein flow downward in contact with the tube wall and in interphase contact with the vapor phase in upward vortex flow. Another portion of the liquid entering the vapor vortex tube will be entrained, mainly as droplets sheared off at the interphase with the vapor phase vortex, and be carried upward with the vapor stream to be deposited on the tube wall higher up especially in the upper section of the tube above the inlet slot 95. Most of this liquid flows down the tube wall but a portion thereof is swept through the tube by the vapor as a film in contect with the wall flowing over the top rim and down the outside of the tube 93. Another portion of the liquid entering through the slot 95 is vaporized by heat absorbed from the warmer vapor phase and a portion of the vapor phase condenses upon the liquid phase. Thus both heat and mass transfer or exchange occurs between the two phases. The relative distributions of the liquid portions within the tubes 93 depend on the nature of the distilland to be fractionated and on the process variables, for instance, flow and temperature variables, the dimensions, shape and pitch of the vapor vortex tubes and other associated apparatus. Shear at the countercurrent interphase enhances the gradual temperature equilibration between the warmer vapor phase and the colder liquid phase over a temperature and pressure gradient established through the length of the vapor vortex tube. Simultaneously an equilibration with respect to composition of the two phases is effected by the partial condensation of the vapor phase and the partial vaporization of the liquid phase and the vapor phase content is thus adjusted continuously as it flows upward through the stack of trays in the fractional distillation column under a diminishing temperature, emerging from the top of the column and is condensed into rectified, distilled fractions.

It is to be understood that the vapor vortex tube may be used in fractional distillation in different modes or combinations without departing from the implied scope of this specification. For instance, the upper and lower sections of the vapor vortex tubes may be discontinuous and may be associated with or extended through separate trays thereby dissociating the phase mixing function of the lower tube section from the phase separation function of the upper tube section into separate effects or trays in alternating order of vertical orientation. One of these tube sections may also be replaced by another means having a similar function without departing from the scope of this specification, for instance the lower tube sections may be replaced by a conventional bubblecap tray or a sieve tray having the upper, phase separation sections comprising vapor vortex tubes of this specification located thereabove and either extending through a separate tray or in another closer association therewith. The vapor vortex tube may also be utilized for fractional distillation or rectification of liquids in different embodiments and remain within the scope of this specification; for instance the tubes may be continuous, communicating with a suitable distillation vessel at their bottom ends and with a suitable condensation and reflux return vessel at their top ends and with vapor rising upward therethrough and reflux liquid flowing downward therethrough between these two vessels.

Having thus described the principles of the vapor vortex tube or flash tube through examples of construction, function and use in preferred forms thereof, it is to be understood that these principles may be used in other embodiments and for other uses then the above and still fall within the scope of this specification.

The invention claimed is:

1. In a method for the distillation, phase separation or vaporization of flowing fluid components wherein heat or mass is exchanged with or between fluid phase thereof, the steps of introducing a liquid component into a radially confined region for flow as a thin annulus on the inside of the radially confined region, said region continuously surrounding a predetermined axis, introducing a vapor component of said fluid into the core of said region, said radially confined region having means imparting rotary motion to the vapor in the core of the region about the axis of the region and spaced from the liquid component annulus, said means imparting rotary motion consisting of an elongate ribbon twisted on its center line, said vapor component being in continuous interfacial shear contact with said liquid component so as to impose shear forces on said liquid component to cause it to flow in single-axis vortex flow, said fluid components being separated by centrifugal forces into a central core region containing a less dense phase circulating about said predetermined axis and within an annular phase of greater density surrounding said core region and also circulating in single-axis vortex flow, said phase of greater density being bound on one side by said confined space to resist said centrifugal forces and to maintain the phase of greater density in a continuous annular stream surrounding said central core region.

2. The method according to claim 1, applied to the distillation of a liquid, comprising the simultaneous steps of:
 (a) partially vaporizing the liquid
 (b) flowing through a confined space
 (c) effecting a continuous reduction of vapor pressure
 (d) imposing centrifugal forces thereon; and thereafter condensing the vapor.

3. In a method for the distillation, phase separation, fluid flow control, or vaporization of flowing fluid wherein heat or mass is exchanged with said fluid or between components thereof, the steps of imposing a force on the fluid to cause it to flow in a predetermined direction within a radially confined space, continuously imparting a rotary motion to said fluid which is substantially normal to said predetermined direction of flow to cause said fluid to flow about said direction as a single-axis vortex flow so that said fluid is separated by centrifugal force into a central core region containing a first fluid component including a less dense gaseous phase circulating about said vortex axis and an annular region containing a second fluid component including a liquid gaseous phase of greater density surrounding said core region, said phase of greater density being bound on one side by said confined space to maintain the liquid in the phase of greater density in a continuous annular stream surrounding said central core region, said radially confined space having means imparting rotary motion to said less dense phase in said central core region about said direction of flow, said means being spaced from said continuous liquid annular stream in the fluid phase of greater density, said means imparting said rotary motion to said less dense phase consisting of an elongate ribbon twisted on its center line, the interface between the less dense phase and the continuous liquid annular stream in said phase of greater density being in continuous shear-flow interfacial contact, said shear-flow contact imparting single-axis vortex flow to the continuous liquid annular stream in said phase of greater density and causing the pressure to decrease as the fluid flows along said predetermined direction of flow.

4. A method as in claim 3 wherein heat is exchanged between said less dense phase and said phase of greater density.

5. A method as in claim 3 wherein mass is exchanged between said less dense phase and said phase of greater density.

6. A method as in claim 3 wherein heat is exchanged between said flowing fluid and another fluid passed in heat exchange relationship therewith.

7. A method as in claim 3 wherein said fluid comprises a liquid phase and a vapor phase and further including the step of adding heat to said liquid phase to supply the heat of vaporization.

8. A method as in claim 3 wherein said fluid comprises a liquid phase and a vapor phase, said vapor phase being at a higher temperature than said liquid phase, and further including the step of causing said vapor phase to flow in countercurrent flow with respect to said liquid phase to thereby effect thermal interaction and rectification of the liquid and vapor phases under a temperature gradient.

9. A method as in claim 3 as applied to the desalination of saline water wherein said water is partially vaporized to form liquid and vapor phases which are then separated into a central core of vapor surrounded by the liquid phase, the pressure on the liquid and vapor phases being continuously reduced as said liquid and vapor phases flow in said predetermined direction, and further including the step of subsequently separating said vapor phase from the residual saline water liquid phase.

References Cited

UNITED STATES PATENTS

| 810,442 | 1/1906 | Sudre | 203—89 XR |
| 2,164,274 | 6/1939 | Ittner | 203—100 |
| 3,265,115 | 8/1966 | Maier | 159—13 |
| 3,273,630 | 9/1966 | Kuhnlein | 159—6 |

FOREIGN PATENTS

| 942,846 | 11/1963 | Great Britain. |
| 1,061,743 | 7/1959 | Germany. |
| 1,114,784 | 10/1961 | Germany. |
| 1,308,577 | 10/1962 | France. |
| 1,348,930 | 12/1963 | France. |

OTHER REFERENCES

Kuwait, October 1956, Chemical Engineering, pp. 126, 128.

NORMAN YUDKOFF, *Primary Examiner.*

D. EDWARDS, *Assistant Examiner.*

U.S. Cl X.R.

203—89; 202—236